United States Patent
Lawal et al.

(10) Patent No.: US 9,634,723 B1
(45) Date of Patent: Apr. 25, 2017

(54) COMMUNICATION BETWEEN PHOTOVOLTAIC DEVICES ON A SHARED POWER LINE

(71) Applicants: Adedayo Moshood Lawal, Austin, TX (US); Dale Ari Herman, Austin, TX (US); Sergio J. Davila, Laredo, TX (US)

(72) Inventors: Adedayo Moshood Lawal, Austin, TX (US); Dale Ari Herman, Austin, TX (US); Sergio J. Davila, Laredo, TX (US)

(73) Assignee: SunPower Corporation, San Jose, CA (US)

( * ) Notice: Subject to any disclaimer, the term of this patent is extended or adjusted under 35 U.S.C. 154(b) by 0 days.

(21) Appl. No.: 14/975,213

(22) Filed: Dec. 18, 2015

(51) Int. Cl.
*H04B 3/00* (2006.01)
*H04B 3/54* (2006.01)
*H04L 25/02* (2006.01)

(52) U.S. Cl.
CPC ........... *H04B 3/54* (2013.01); *H04L 25/0272* (2013.01); *H04B 2203/5483* (2013.01); *H04L 25/0266* (2013.01); *H04L 25/0292* (2013.01)

(58) Field of Classification Search
CPC .............. H04B 3/54; H04B 2203/5483; H04B 2203/5445; H04L 25/0272; H04L 25/0292; H04L 25/0266; H02J 13/002; H02J 3/383; Y04S 10/123; Y10T 307/707
See application file for complete search history.

(56) References Cited

U.S. PATENT DOCUMENTS

| | | | |
|---|---|---|---|
| 2012/0089260 A1* | 4/2012 | Krohne | H02J 13/002 700/286 |
| 2013/0022135 A1* | 1/2013 | Mouri | H04L 12/4625 375/257 |
| 2014/0036047 A1* | 2/2014 | Watanabe | G02B 27/2214 348/54 |

* cited by examiner

*Primary Examiner* — Janice Tieu
(74) *Attorney, Agent, or Firm* — Blakely Sokoloff Taylor Zafman LLP

(57) ABSTRACT

An electric system, method, and computer-readable medium facilitate shared access to a shared power line for communication using a PLC protocol. The electric system, method, and computer-readable medium may determine when the shared power line is available for a transmission, allocate unicast transmission time slots to each of a plurality of inverters, transmit a multicast message requesting that each of the plurality of inverters communicate information during its allocates transmission time slot, determine whether a first inverter in the plurality of inverters did not communicate using the shared power line during its allocated unicast transmission time slot, and if the first inverter did not communicate information during its allocated unicast transmission time slot, transmit with the line interface a jam signal during the first inverter's unicast transmission time slot.

20 Claims, 6 Drawing Sheets

COMMUNICATION BETWEEN PHOTOVOLTAIC DEVICES ON A SHARED POWER LINE

BACKGROUND

Photovoltaic (PV) cells, commonly known as solar cells, are devices for conversion of solar radiation into electrical energy. Generally, solar radiation impinging on the surface of, and entering into, the substrate of a solar cell creates electron and hole pairs in the bulk of the substrate. The electron and hole pairs migrate to p-doped and n-doped regions in the substrate, thereby creating a voltage differential between the doped regions. The doped regions are connected to the conductive regions on the solar cell to direct an electrical current from the cell to an external circuit. When PV cells are combined in an array such as a PV module, the electrical energy collected from all of the PV cells can be combined in series and parallel arrangements to provide power with a certain voltage and current.

In addition to PV modules, solar module systems include additional hardware. Such hardware may include inverters, power meters, and solar module system controllers. If may be advantageous for this hardware to communicate over a shared power line using a power line communication (PLC) protocol.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

SUMMARY

Figure 1:
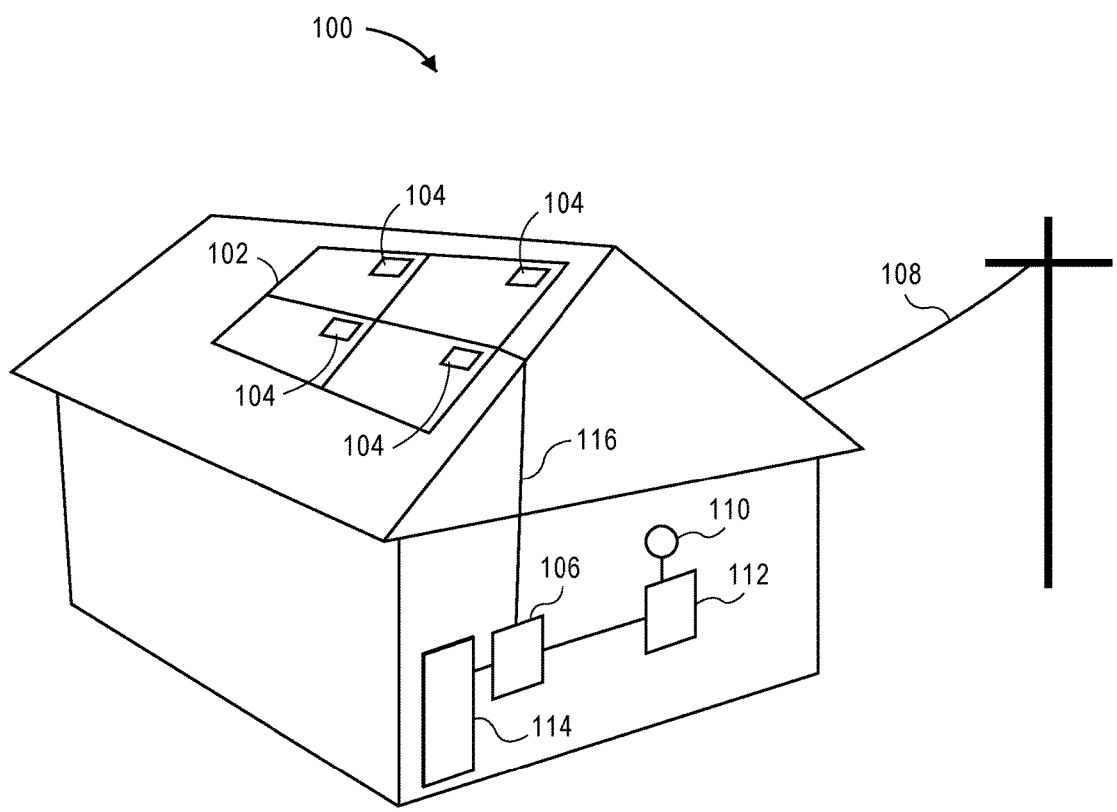
FIG. 1 illustrates an example electric system, according to some embodiments.

In an embodiment, an electric system coupled to a shared power line includes: a plurality of inverters, each inverter coupled to the shared power line and adapted to use the shared power line to communicate information; and a first supervisor coupled to the shared power line, the first supervisor including: a line interface coupled to the shared power line, a processor, and a program memory storing executable instructions that when executed by the processor cause the first supervisor to: determine with the line interface whether the shared power line is busy, if the shared power line is not busy, allocate unicast transmission time slots to each of the plurality of inverters, transmit with the line interface a broadcast message requesting that each of the plurality of inverters communicate information during its allocated unicast transmission time slot using the shared power line, determine with the line interface whether a first inverter in the plurality of inverters did not communicate using the shared power line during its allocated unicast transmission time slot, and if the first inverter did not communicate information during its allocated unicast transmission time slot, transmit with the line interface a jam signal during the first inverter's unicast transmission time slot.

In another embodiment, a method of coordinating multiple access of a shared power line by a plurality of inverters and one or more supervisors includes: determining with a first supervisor whether the shared power line is busy; if the shared power line is not busy, allocating with the first supervisor unicast transmission time slots to each of the plurality of inverters, transmitting with the supervisor a broadcast message requesting that each of the plurality of inverters communicate information during its allocated unicast transmission time slot using the shared power line; determining with the first supervisor whether a first inverter in the plurality of inverters did not communicate using the shared power line during its allocated unicast transmission time slot; and if the first inverter did not communicate information during its allocated unicast transmission time slot, transmitting with the first supervisor a jam signal during the first inverter's unicast transmission time slot.

In still another embodiment, a tangible, computer-readable medium storing executable instructions that when executed by a processor of a supervisor coupled to a shared power line causes the supervisor to: determine whether the shared power line is busy; if the shared power line is not busy, allocate unicast transmission time slots to each of a plurality of inverters coupled to the shared power line; transmit a broadcast message requesting that each of the plurality of inverters communicate information during its allocated unicast transmission time slot using the shared power line; determine whether a first inverter in the plurality of inverters did not communicate using the shared power line during its allocated unicast transmission time slot; and if the first inverter did not communicate information during its allocated unicast transmission time slot, transmit a jam signal during the first inverter's unicast transmission time slot.

DETAILED DESCRIPTION

The following detailed description is merely illustrative in nature and is not intended to limit the embodiments of the subject matter of the application or uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

TERMINOLOGY

The following paragraphs provide definitions and/or context for terms found in this disclosure (including the appended claims):

"Comprising." This term is open-ended. As used in the appended claims, this term does not foreclose additional structure or steps.

"Configured To." Various units or components may be described or claimed as "configured to" perform a task or tasks. In such contexts, "configured to" is used to connote structure by indicating that the units/components include structure that performs those task or tasks during operation. As such, the unit/component can be said to be configured to perform the task even when the specified unit/component is not currently operational (e.g., is not on/active). Reciting that a unit/circuit/component is "configured to" perform one or more tasks is expressly intended not to invoke 35 U.S.C. §112, sixth paragraph, for that unit/component.

"First," "Second," etc. As used herein, these terms are used as labels for nouns that they precede, and do not imply any type of ordering (e.g., spatial, temporal, logical, etc.). For example, reference to a "first" microinverter does not necessarily imply that this microinverter is the first microinverter in a sequence; instead the term "first" is used to differentiate this microinverter from another microinverter (e.g., a "second" microinverter).

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

"Coupled"—The following description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically.

"Inhibit"—As used herein, inhibit is used to describe a reducing or minimizing effect. When a component or feature is described as inhibiting an action, motion, or condition it may completely prevent the result or outcome or future state completely. Additionally, "inhibit" can also refer to a reduction or lessening of the outcome, performance, and/or effect which might otherwise occur. Accordingly, when a component, element, or feature is referred to as inhibiting a result or state, it need not completely prevent or eliminate the result or state.

In addition, certain terminology may also be used in the following description for the purpose of reference only, and thus are not intended to be limiting. For example, terms such as "upper", "lower", "above", and "below" refer to directions in the drawings to which reference is made. Terms such as "front", "back", "rear", "side", "outboard", and "inboard" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import.

In the following description, numerous specific details are set forth, such as specific operations, in order to provide a thorough understanding of embodiments of the present disclosure. It will be apparent to one skilled in the art that embodiments of the present disclosure may be practiced without these specific details. In other instances, well-known techniques are not described in detail in order to not unnecessarily obscure embodiments of the present disclosure.

FIG. 1 is a diagram of an example electric system 100. The electric system 100 includes a solar panel system 102 including one or more photovoltaic modules, one or more inverters 104 coupled to the solar panel system 102, and a photovoltaic supervisor system ("PV supervisor" or "supervisor") 106. The one or more inverters 104 may be string inverters or "microinverters" (MI) as discussed in further detail below. The electric system 100 also includes a connection 108 to a utility grid, an electric meter 110 for the connection 108 to the utility grid, and an electric panel 112 for the electric system 100. Additionally, the electric system 100 may include an energy storage device 114 (e.g., one or more batteries coupled to a control system of one or more computers). The inverters 104, PV supervisor 106, connection 108 to a utility grid, electric meter 110, electric panel 112, and energy storage device 114 may be coupled together by a shared power line 116.

The shared power line 116 may be a split-phase alternating current (AC) power line operating at the standard voltage (e.g., 110 V, 120 V, 208 V, 220 V, 230 V, 240 V, etc.) and frequency (e.g., 50 Hz, 60 Hz) of the locality. For example, in the United States, the shared power line 116 may be configured for split-phase AC electricity at 240 V and 60 Hz. It will be understood that the disclosed embodiments are not limited to split-phase AC, but may also include single-phase AC or three-phase AC. The shared power line 116 may couple all of the AC components of the electric system 100 (e.g., inverters 104, PV supervisor 106, electric meter 110, electric panel 112, energy storage device 114) to the utility grid via the connection 108. For the purposes of PLC communication discussed herein, this shared connection between the AC components of the electric system 100 may be referred to as a "PLC bus." If a first electric system 100 and a second electric system 100 are coupled together, then the shared power line 116 of the first electric system 100 and the shared power line 116 of the second electric system 100 are effectively the same shared power line 116, so it will be understood that a message transmitted on the shared power line 116 of the first electric system 100 will be receivable by all of the devices on both the first electric system 100 and the second electric system 100. Accordingly, these coupled shared power lines 116 may be collectively referred to as a single shared power line 116 herein.

While FIG. 1 depicts a single electric system 100 on a single building, it will be understood that several electric systems 100 could be connected together, either directly by a shared power line 116, or via the utility grid. For example, a first electric system 100 (including a solar panel system 102, inverters 104, PV supervisor 106, etc.) could be installed at a first house on a street, and a second electric system 100 (including a solar panel system 102, inverters 104, PV supervisor 106, etc.) could be installed at a second house on the same street, or on a second street in the same neighborhood, or otherwise nearby. As a second example, a large building or campus may have more than one electric system 100 installed (e.g., on the roof, on a carport, on a ground mounted system) with each electric system 100 connected via a shared power line 116. In some embodiments, the first electric system 100 and the second electric system 100 are coupled to the same main electrical transformer via the utility grid and the electric system's 100 respective connections 108. Accordingly, the shared power line 116 of the first electric system 100 is electrically coupled to the shared power line 116 of the second electric system 100. As discussed herein, the PV supervisor 106 of the each electrical system 100 is configured to determine whether the shared power line 116 is currently being used for communication before broadcasting a message on the shared power line 116.

When the sun is shining on the solar panel system 102, the solar panel system 102 produces direct current (DC) electric power and provides the DC power to the inverters 104. In response, the inverters 104 produce AC power for consumption by loads on the electric system 100 or for providing to the connection 108 to the utility grid. When the loads on the electric system 100 consume more power than is provided by the solar panel system 102, the loads draw power from the connection 108 to the utility grid. When loads consume less power than is provided by the solar panel system 102, the solar panel system 102 can provide the excess power to the connection 108 to the utility grid and/or the energy storage device 114. Although FIG. 1 illustrates a grid-tied electric system 100, the systems and methods described in this specification can be applied in various other types of electric systems. Further, it will be understood that the electric system 100 may include other types of power generators (e.g., solar thermal power systems, wind turbines, steam turbines, diesel generators, etc.) instead or in addition to the solar panel system 102.

The one or more inverters 104 may be string inverters 104 or MIs 104. String inverters 104 are adapted to be connected to one or more photovoltaic modules in series or in parallel, receive the DC power generated by the photovoltaic modules, and output AC power. In some embodiments, the string inverter 104 may output the AC power it generates to electric panel 112, which is in turn coupled to the load on the electric system 100 and/or the connection 108 to the utility grid as discussed herein. The electric system 100 may include one or more string inverters 104S. In contrast, MIs 104 are dedicated to a single solar module, receive the DC power generated by that single solar module, and output AC power to the electric panel 112. MIs 104 may be connected in electrical parallel or electrical series to each other, thus the AC power generated by each MI 104 is combined and either consumed by the load on the electric system 100 or provided to the connection 108 to the utility grid.

The PV supervisor 106 is a computing system configured, by virtue of appropriate programming, to monitor the solar panel system 102 and perform one or more actions based on monitoring the solar panel system 102. For example, the PV supervisor 106 can be configured for interfacing with net and sub meters, inverters 104, and other components of the system. In some examples, the PV supervisor 106 measures power output by the solar panel system 102 and transmits measurements to a remote system, e.g., a homeowner's computer system, a building manager's computer system, or a solar panel manufacturer or installer computer system. In some examples, the PV supervisor 106 does not directly monitor the solar panel system 102; instead, the PV supervisor 106 can monitor or meter the inverters 104 coupled to the solar panel system 102. As discussed herein, the PV supervisor 106 can communicate with the inverters 104, electric meter 110, and energy storage device 114 using a PLC protocol on a shared power line 116. The PV supervisor 106 can be enclosed in a weatherproof housing for outdoor installation.

Figure 2:
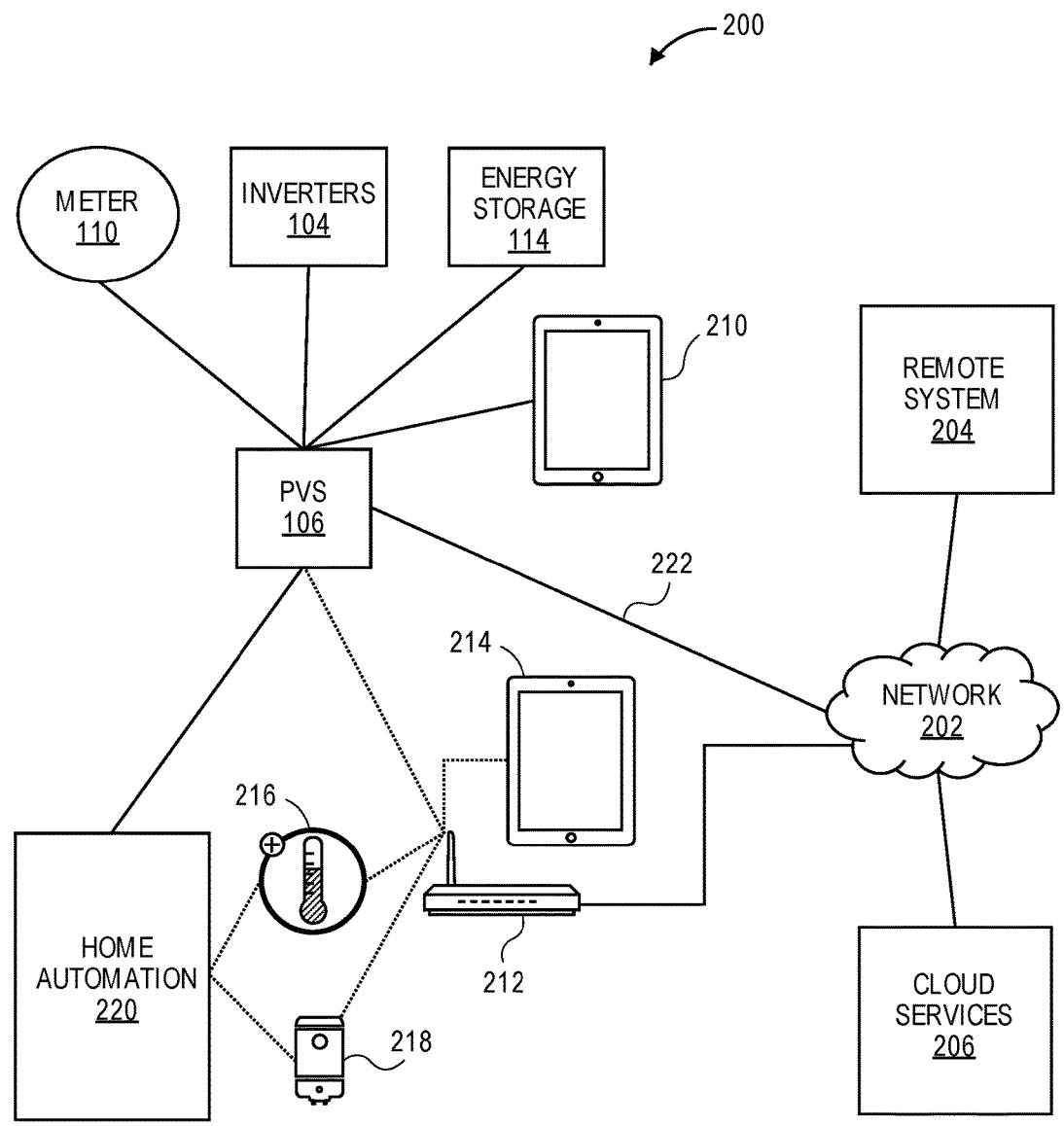
FIG. 2 illustrates an example environment for a photovoltaic supervisor system.

FIG. 2 is a block diagram of an example environment 200 for the PV supervisor 106. The PV supervisor 106 can communicate with the inverters 104, electric meter 110, which can be a smart meter, and energy storage device 114 using a PLC protocol on a shared power line 116. Additionally or alternatively, the PV supervisor 106 can communicate with the electric meter 110 and energy storage device 114 using other wired or wireless connections discussed herein. Further, in addition to or alternative to the PLC techniques discussed here, the PV supervisor 106 may communicate with the inverters 104 using other wired (e.g., USB, Ethernet, etc) or wireless connections The PV supervisor 106 may communicate over a data communications network 202, e.g., the Internet, with a remote system 204 executing on a system of one or more computers and/or one or more computer servers providing cloud computing services 206 related to energy monitoring and management of the electric system 100.

The PV supervisor 106 can communicate, either directly or over a data communications network, with one or more optional components of the system, including a commissioning device 210, e.g., a tablet computer or other appropriate computing device used to verify properties of a solar system after installation; and a wireless access point 212 for accessing, e.g., a local area network (LAN). The PV supervisor 106 can communicate, using the wireless access point 212, with a customer device 214 such as a tablet computer; the remote system 204 and the cloud services 206 using the network 202; a smart thermostat 216; one or more controllable electric loads 218; and a home automation system 220. The home automation system 220 can include one or more computers providing one or more services such as personal safety applications and appliance control applications.

In operation, the PV supervisor 106 can take energy measurements and transmit the energy measurements to the remote system 204. The PV supervisor 106 can transmit the energy measurements to other systems, e.g., the cloud services server 206, which can be configured to provide computing services for, e.g., home automation. In some examples, the remote system 204 and/or the cloud services server 206 can be configured for remote configuration modification and troubleshooting of the PV supervisor 106, e.g., using a cloud-hosted web application. Alternatively or additionally, the PV supervisor 106 may make diagnostic measurements of the electric system 100 and transmit such diagnostics to the remote system 204 and/or cloud services server 206.

Some applications depend on the energy measurements or electric system diagnostics from the PV supervisor 106. For those applications, it can be useful for the PV supervisor 106 to be able to communicate on multiple communication channels. For example, the PV supervisor 106 can be configured to transmit energy measurements to the remote system 204. The PV supervisor 106, in normal operation, transmits the measurements to the wireless access point 212, which routes the measurements to the remote system 204.

When the PV supervisor 106 determines that the wireless access point 212 is not available, e.g., due to malfunction, the PV supervisor 106 can switch from transmitting to the wireless access point 212 to transmitting over a cellular network 222. When the PV supervisor 106 determines that the cellular network 222 is not available, e.g., due to malfunction, the PV supervisor 106 can switch from transmitting on the cellular network 222 to another communications channel or protocol, e.g., a power line communications channel.

Various failover scenarios are possible. In general, the PV supervisor 106 is configured to communicate using more than one communications channel and to switch between channels in response to determining that a channel is not available for communication. In some examples, the PV supervisor 106 can determine that a channel is not available when an expected acknowledgement message is not received, or when a device, e.g., wireless access point 212, sends a message indicating that it is not available for communication.

Figure 3:
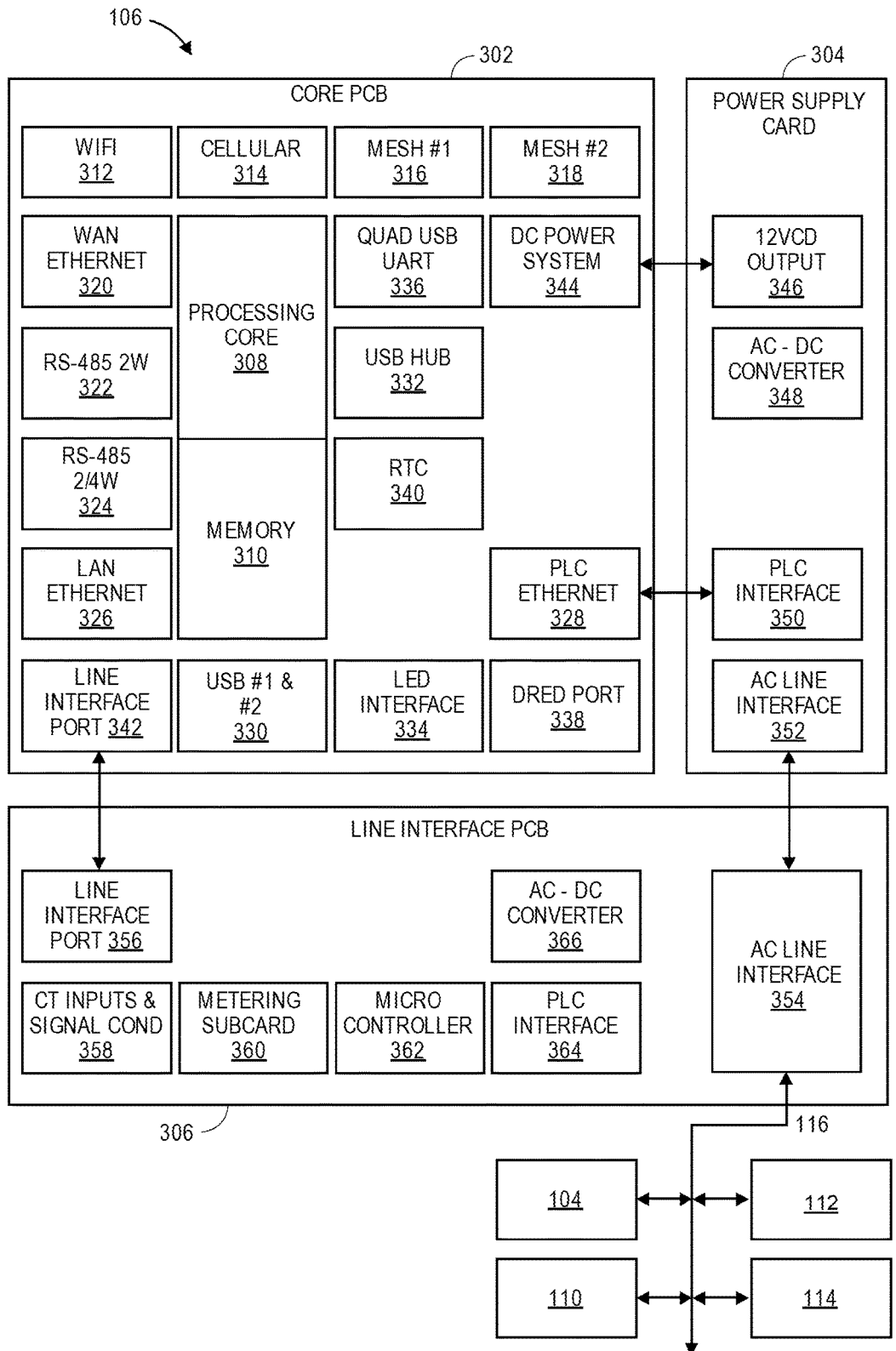
FIG. 3 illustrates a block diagram of an example photovoltaic supervisor system.

FIG. 3 is a block diagram of an example PV supervisor 106. The PV supervisor 106 is illustrated as being implemented by electric components on three separate physical structures for purposes of illustration. The PV supervisor 106 can be implemented using any appropriate combination of one or more circuit structures, e.g., printed circuit boards (PCBs) and other types of cards.

The PV supervisor 106 includes a core PCB 302, a power supply card 304, and a line interface PCB 306 (e.g., an AC line interface). The core PCB 302 includes a processing core 308 and memory 310. The processing core can be one or more processors configured to execute, e.g., a LINUX kernel. The memory 310 can include, e.g., flash storage and dynamic random access memory. In operation, the processing core 308 executes software to cause the PV supervisor 106 to perform various functions, e.g., taking measurements, transmitting measurements, switching communication channels in response to detecting lack of availability of communication channels, and executing control algorithms for other components.

The PV supervisor 106 includes a data communication system that includes wireless communication radios and wired communication circuits. As illustrated, the PV supervisor 106 includes, for wireless communication: a WiFi radio 312, e.g., an 802.11 (e.g., a, b, g, n, ac) WiFi radio; a cellular radio 314, e.g., a 3G/4G/LTE radio; and two separate mesh network radios 316 and 318, e.g., Zigbee radios for direct communications with smart meters and/or home automation devices. The PV supervisor 106 includes, for wired communication: a wide area network (WAN) Ethernet port (320); an RS-485 2 wire port 322; an RS-485 2/4 wire port 324; a LAN Ethernet port 326; and a power line communication (PLC) Ethernet port 328.

The core PCB 302 can include various other interfaces, e.g., first and second universal serial bus (USB) ports 330 and a USB hub 332 for expansion capabilities; a light emitting diode (LED) interface 334 for status indicators on an external enclosure or on-board LED indicators for an indoor enclosure; a quad USB universal asynchronous receiver/transmitter (UART) port 336, e.g., for supporting communication with the line interface PCB 306; and multi-purpose digital I/O connector 338 for grid control interface devices such as the demand response enabling device (DRED) interface, used in Australia, and Ripple Control, used in Germany, for receiving control signals from a utility. The core PCB 302 can include a real-time counter (RTC) 340, an electrically isolated line interface port 342 for connecting to the line interface PCB 306, and a DC power system interface 344 for connecting to the power supply card 304.

The core PCB 302 can be implemented using various custom or off-the-shelf communication components. For example, the core PCB 302 can be implemented using a wireless router processor. Such a processor can include a built-in 802.11n wireless radio and multiple Ethernet ports for LAN and WAN. To implement the PLC Ethernet 328, the core PCB 302 include a chipset for HOMEPLUG AV compatible networking over AC power lines. The cellular radio 314 can be implemented using a MiniPCI (USB) based internal, replaceable cellular communications card, suitable for domestic and foreign radio networks. The serial communications ports The power supply card 304 is configured to supply power to the PV supervisor 106 and includes a low voltage, e.g., 12 V DC, output 346, an AC-DC converter 348, a PLC interface 350, and an AC line interface 352. The line interface PCB 306 is configured to electrically couple to the electrical system 100 for metering, communication, diagnostics, etc. and includes an AC line interface 354 for coupling to the power supply card 304 and an AC line interface port 356 for coupling to the core PCB 302. The line interface PCB 306 also includes one or more measurement inputs 358 for coupling to, e.g., current transformers (CTs) for taking energy measurements. The measurement inputs 358 can include one or more signal conditioning circuits.

The line interface PCB 306 includes a metering subcard or metering circuit subsection 360 for taking energy measurements and a microcontroller 362 for, e.g., controlling the operation of the line interface PCB 306 and the communications functions of monitoring the shared power line 116 and relaying information related to the shared power line 116 (e.g., received signal strength indicator (RSSI)) to the core PCB 302. The line interface PCB 306 includes an AC-DC converter 366 and a PLC interface 364 that is separate from the PLC interface 350 used by the power supply card 304. The PLC interface 364 may include a sensor to measure the received signal strength of the PLC band on the shared power line 116 and may output this received signal strength to the microcontroller 362, which in turn may calculate the RSSI of the PLC band on the shared power line 116. It will be understood that the PLC band could be any of a number of frequencies can may be modulated on to the shared power line 116. For example, the PLC band may be located between 90 kHz and 115 kHz, or on any other suitable band. In some embodiments, the PLC band is centered on 109.2 kHz. It will be understood that government and utility regulations may determine the frequency of the PLC band.

The PV supervisor 106 can be configured to connect to the other devices (e.g., inverter 104, electric meter 110, energy storage device 114, etc.) in the electric system 100 using, e.g., the PLC interface 364. The PV supervisor 106 can push firmware upgrades to the other devices (e.g., inverter 104, electric meter 110, energy storage device 114, etc.) in the electric system 100. The PLC interface 364 may be configured to modulate and demodulate information on the shared power line 116. It will be understood that the PLC interface 364 may use any of a number of known modulation techniques. Such known modulation techniques include amplitude shift keying (ASK), amplitude and phase shift keying (APSK), continuous phase modulation (CPM), frequency-shift keying (FSK), multiple frequency-shift keying (MFSK), minimum shift keying (MSK), on-off keying (OOK), pulse-position modulation (PPM), phase-shift keying (PSK), quadrature amplitude modulation (QAM), single-carrier frequency division multiple access (SC-FDE), or Trellis modulation (TCM). The modulation technique used by the PLC interface 364 depends upon the modulation scheme used in the PLC protocol used by the electric system 100. Further, PLC communication over the shared power line 116 may be conducted at any of a number of symbol rates (e.g., 2400 baud, 4800 baud) depending in part on the capabilities of system hardware and operating conditions. For example, the PLC interface 364 may modulate and demodulate signals using binary FSK at 2400 baud or 4800 baud when the PLC protocol used by the electric system 100 requires binary FSK and the electric system 100 can accommodate transmissions a 2400 baud or 4800 baud. It will be understood that any device (e.g., inverter 104, electric meter 110, energy storage device 114, etc.) configured to communicate using the PLC protocol on the shared power line 116 may include its own modulator and demodulator.

In operation, the line interface PCB 306 provides a single point of installation for AC connectivity and for integrating PLC communications, e.g., inverter 104 PLC communications and networking/communication features of the core PCB 302. In some examples, the line interface PCB 306 supports various electric system installations, e.g., U.S. residential 120V, 208/240V split phase installations; provides safety isolation (SELV) between high voltage AC connections and low voltage (consumer electronics interconnections) from the core PCB 302; can include integrated AC line protection circuits, including fusing, varistors (e.g., metal-oxide varistors), and gas discharge tubes (GDTs), and provides AC voltage surge and transient protection; provides firmware processing of communications data to/from inverters 104 and data interchange to/from system software executing on the core PCB 302.

In some examples, the power supply card 304 is configured for a 100-250 V AC input range for worldwide operation. The power supply card 304 can output low voltage, e.g., 12 V DC for the core PCB 302, e.g., the main bus voltage of the core PCB 302. The power supply card 304 can include integrated AC line protection circuits, including fusing, varistors (e.g., metal-oxide varistors), and gas discharge tubes (GDTs). In some examples, the AC line protection circuits are also included in the line interface PCB 306, and the use of those AC line protection circuits can significantly benefit the integration of metering functionality. The power supply card 304 can include integrated PLC coupling transformers and a zero crossing detector circuit.

The PV supervisor 106 can be configured, by virtue of the various data communication components, to communicate in a variety of different scenarios. For example, the PV supervisor 106 can be configured to connect to three separate Zigbee networks running different protocols using the two mesh network radios 316 and 318, or two separate Zigbee networks running different protocols and one other network utilizing an 802.15.4 physical layer, e.g., a network using IPv6 over low power wireless personal area networks (6LoWPAN) or THREAD. For example, such connections can enable lost cost consumption (net) metering by connecting to a smart meter over a Zigbee SEP 1.X or 2.0 network while simultaneously communicating within a Zigbee home automation network and a Zigbee network with a proprietary protocol communicating with an inverter. Alternatively, the PV supervisor 106 can connect with a smart meter with a home automation network utilizing THREAD. In some examples, the PV supervisor 106 optionally includes one or more 802.15.4 radios.

In some examples, the PV supervisor 106 can connect to a LAN using WiFi while simultaneously acting as a WiFi access point to allow a user device to connect to allow configuration. For example, the PV supervisor 106 can serve as a local human-machine interface (HMI) over direct connection to the system's internet protocol (IP) address.

The PV supervisor 106 can be configured to switch between LAN and WAN connections and other connections, automatically, as appropriate, and the PV supervisor 106 can alter the amount and frequency of data transmitted depending on the type of connection. The PV supervisor 106 can be configured to connect to inverters and other power electronic devices using the RS-485 physical layer and proprietary protocols, e.g., Modbus RTU or Modbus TCP. Since the core PCB 302 can include two RS-485 ports 322 and 324, the PV supervisor 106 can support two such connections simultaneously which may use different protocols.

Figure 4:
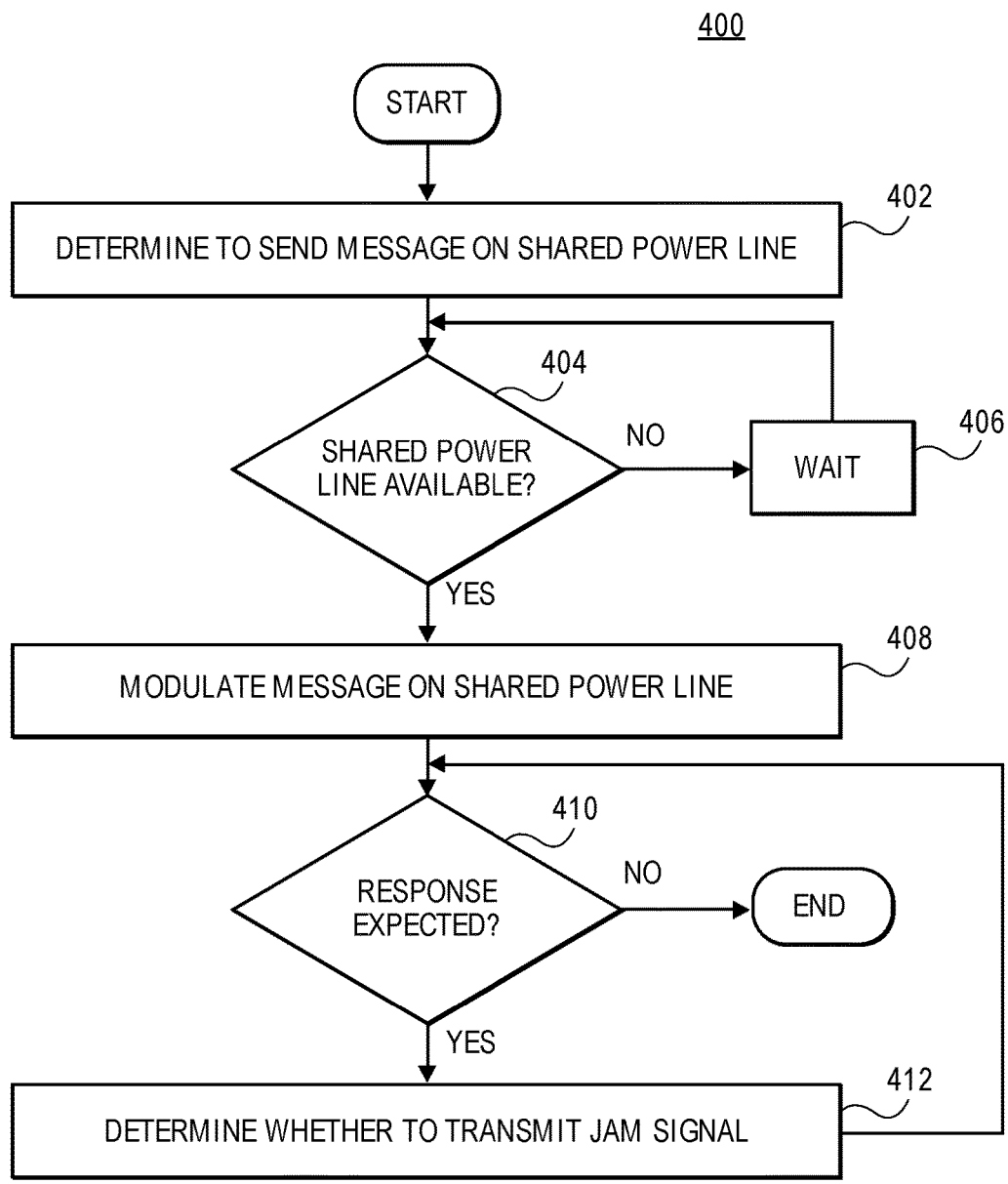
FIG. 4 depicts an example PV supervisor operation method for implementing the shared power line multiple access in accordance with the presently described embodiments.

Turning now to FIG. 4, a flow chart illustrating a method 400 for a PV supervisor 106 communicating with other devices (e.g., inverter 104, electric meter 110, energy storage device 114, etc.) in the electric system 100 using PLC is shown, according to some embodiments. In various embodiments, the method of FIG. 4 can include additional (or fewer) blocks than illustrated. For example, in some embodiments, the PV supervisor 106 may perform a calibration process before block 402. While in the embodiment described in FIG. 4 may be performed by the PV supervisor, it will be understood that the steps of FIG. 4 may be performed by any type of PLC network controller.

At block 402, the PV supervisor 106 determines to send a message on the shared power line 116. The message may be a multicast message intended for all of the devices (e.g., inverters 104, electric meter 110, energy storage device 114, etc.) in the electric system 100 or a unicast message intended to be received and acted upon by a single device. Such messages can be short or long depending on the message type.

Multicast messages can include, for example, requests for the operating status of the inverters 104 (e.g., inverter temperature, inverter input voltage, inverter output voltage, inverter input current, inverter output current, output frequency, etc.) along with information allocating response resources for each inverter 104 to respond. Because the shared power line 116 is shared by all of the devices, it may be beneficial to manage access to the shared power line 116 to avoid collisions and lost data. In some embodiments, the PV supervisor 106 may user a time division multiple access (TDMA) scheme to manage access to the shared power line 116, allocating a response time slot for each inverter 104. Of course, it will be understood that the PV supervisor 106 may utilize other known multiple access schemes such as frequency division multiple access (FDMA) or code division multiple access (CDMA) in addition to or as an alternative to TDMA.

Unicast messages may include requests for a single device (e.g., inverter 104, electric meter 110, energy storage device 114, etc.) to perform a particular action such as changing operating mode for an inverter 104, to shut itself down, to receive a firmware update, etc. It may be advantageous for the PV supervisor 106 to send a multicast message before a unicast message to inform all of the other devices that the unicast message is intended only for a particular device. Accordingly, it may be advantageous for each device in the electric system 100 to have a unique identifier (e.g., a MAC address, a dynamically allocated address, etc.).

After determining to send a message on the shared power line 116, at block 404 the PV supervisor 106 determines whether the shared power line 116 is available for transmission. The process performed by blocks 404 and 406 may be collectively referred to as carrier sense multiple access (CSMA). Before transmitting its message, each PV supervisor 106 measures the shared power line 116 to determine whether another device is transmitting on the shared power line 116. As discussed herein, the PV supervisor 106 of a first electric system 100 may be coupled to by the utility grid to second, third, fourth, etc. electric systems 100, each with its own devices (e.g., PV supervisor 106, inverters 104, etc.), and any of the devices coupled to the shared power line 116 couple be transmitting at a particular time.

At block 404 the PV supervisor 106 measures the shared power line 116 to determine the RSSI of the PLC band over a time interval. In some embodiments, if the PV supervisor 106 determines that the average RSSI over the time interval (e.g., 8 ms) is below a line available threshold level (e.g., 35 dBmV), the PV supervisor 106 determines that the shared power line 116 is not in use. Conversely, in some embodiments if the PV supervisor determines that the average RSSI over the time interval (e.g., 8 ms) is above the line available threshold level (e.g., 35 dBmV), the PV supervisor 106 determines that the shared power line 116 is in use. It may be advantageous to adjust either or both of the time interval (i.e., shorter or longer) and the line available threshold level (e.g., from 35 dBmV to 40 dBmV or to 25 dBmV) depending on conditions at the site. If the level of background interference is high, for example, it may be advantageous to extend the time interval and/or increase the line available threshold level. Such adjustments may be perform manually in the field by a technician, remotely over the network 202 by a technician or automated system (e.g., remote system 204, one or more computer servers providing cloud computing services 206), or by the PV supervisor 106 measuring the noise level and increasing the line available threshold itself. In other embodiments, it may be advantageous for the PV supervisor 104 or automated system to determine the time interval and line available threshold level dynamically (e.g., periodically, before the transmission of each multicast message, etc.).

The dynamic determination of the line available threshold level may be performed by the PV supervisor 104, remote system 204, or one or more computer servers providing cloud computing services 206 based on historical RSSI measurement data determined from the power line 116, and a log of past communications on the shared power line 116. The historical RSSI measurement data may include RSSI measurements determined from the power line 116 over a period of time (e.g., 1 hour, 2 hours, 3 hours, 1 day) cross-referenced with the log of past communications during the period of time. The log of past communications may include all transmission sent by the PV supervisor 106 and the transmissions sent by devices on the electric system 100 (e.g., inverter 104, electric meter 110, electric storage device 114). The log of past communications may also include transmissions made by the PV supervisor 106 and devices of a second, third, fourth, etc. electric system 100 if such transmission are received and can be decoded. Using the historical RSSI data and log of past communications, the average RSSI during intervals where no transmissions were made or received by the PV supervisor 106 may be determined ("average noise RSSI"). The average noise RSSI may represent an expected level of interference (e.g., from loads, weather, electromagnetic interference) on the shared power line 116. The average noise RSSI may be used as the line available threshold.

If the PV supervisor 106 determines that the shared power line 116 is in use, at block 406 the PV supervisor 106 waits for a period of time (e.g., a fixed period of time like 10 ms, a randomly chosen period of time) and repeats block 404 again to determine whether the shared power line 116 is in use another time. If the PV supervisor 106 determines that the shared power line 116 is available, the PV supervisor 106 modulates the message onto the AC waveform carried on the shared power line 116 as discussed herein (e.g., by binary FSK). If the PV supervisor 106 does not expect a device (e.g., inverter 104, electric meter 110, electric storage device 114) to respond to the message because no response is need or all devices have already responded, the method 400 ends.

If, however, the PV supervisor 106 expects a response, at block 412 the PV supervisor 106 determines whether it should transmit a jam signal on the shared power line 116. Because a device (e.g., inverter 104, electric meter 110, electric storage device 114) may fail to transmit during its allocated time (e.g., because of a hardware or software malfunction), it may be advantageous to transmit a jam signal to prevent a second, third, fourth, etc. PV supervisor 106 from a second, third, fourth, etc. electric system 100 to erroneously determine that the shared power line 116 is not in use. Such a jam signal would cause a second, third, fourth, etc. PV supervisor 106 from a second, third, fourth, etc. electric system 100 to measure an average RSSI over a time interval over the threshold level indicating that the shared power line 116 is in use. Having determined that the shared power line 116 is in use, the second, third, fourth, etc. PV supervisor 106 from the second, third, fourth, etc. electric system 100 would wait to transmit its message as discussed herein (block 406). The process performed at block 412 is discussed in further detail in relation to FIGS. 5 and 6 herein.

Figure 5:
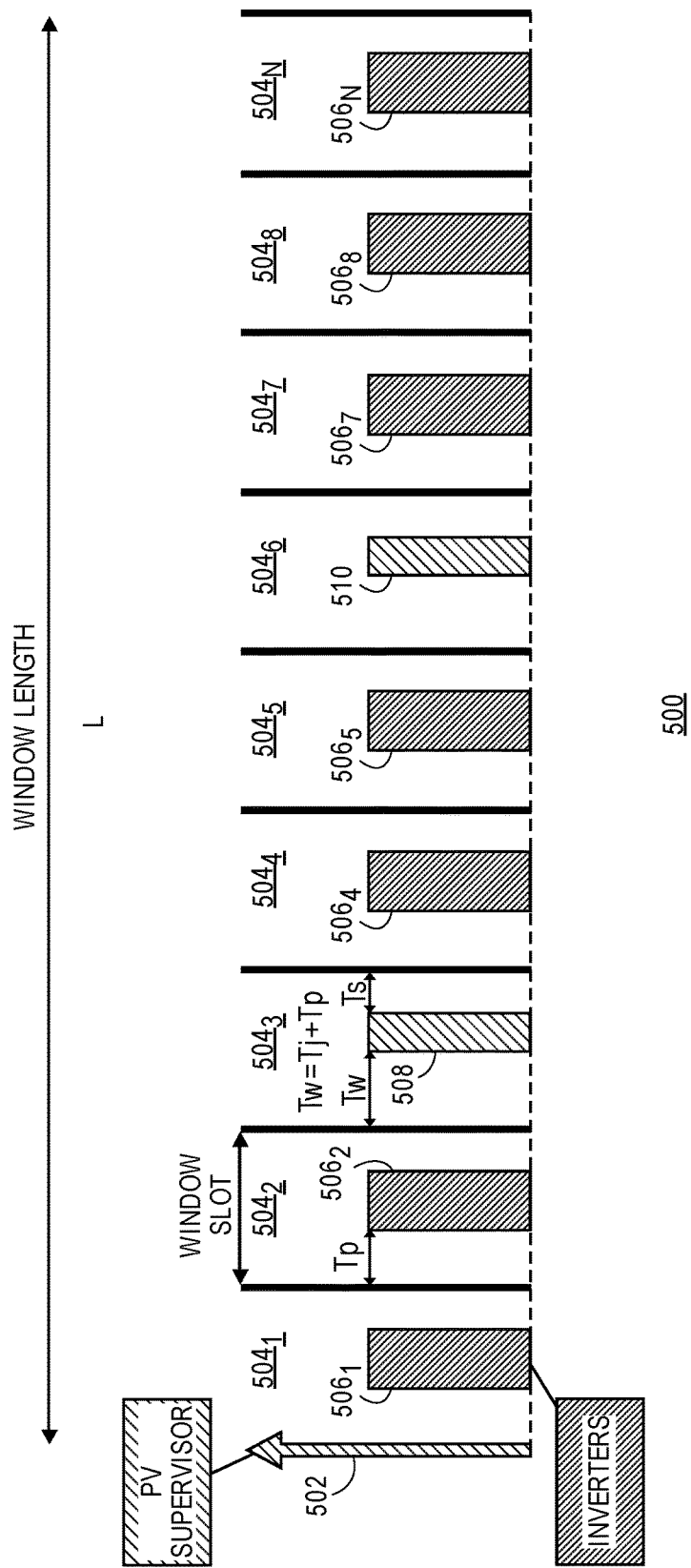
FIG. 5 illustrates an example transmission window in accordance with the presently described embodiments.

Turning now to FIG. 5, a graphical representation of a transmission window 500 and the transmissions by a PV supervisor 106 and one or more inverters 104 (or other devices) on a shared power line 116 is shown, according to some embodiments. The transmission window 500 has a window length L. Having determined that the shared power line 116 is available, a PV supervisor 106 transmits a multicast message 502 on the shared power line 116 at the beginning of the transmission window 500. As discussed herein, the multicast message may request a response from other devices (e.g., inverters 104) in the electric system 100 and may allocate a response time for each specific device. For example, the PV supervisor 106 may request that a first inverter 104 respond during transmission slot $504_1$ by transmitting a response $506_1$, a second inverter 104 respond during transmission slot $504_2$ by transmitting a response $506_2$, and an N-th inverter 104 respond during transmission slot $504_N$ by transmitting a response $506_N$.

The window length L may be determined dynamically depending on the number and content of expected responses 502 (e.g., expecting more and/or longer responses 506 may result in a longer window length L). The transmission slots 504 may be of equal duration, or they may be of differing duration. For example, the transmission slot $504_1$ may be twice as long as transmission slot $504_2$, but thirty percent shorter than transmission slot $504_3$. The duration of the window length L and the number and/or duration of transmission slots 504 may be dynamically determined based on system requirements (e.g., a minimum duration as dictated by the PLC protocol, a maximum duration), the number and content of expected responses 502 (e.g., expecting more and/or longer responses 506 may result in a longer window length L, a response $506_2$ may be longer or shorter than a response $506_2$), and operating condition (e.g., shorter window length L and/or fewer or shorter transmission slots 504 when there are many electric systems 100 on the shared power line 116 and/or interference is high.). For example, a relatively short response 506 may be about 80 ms long in duration and a relatively long response 506 may be about 200 ms long in duration. It will be understood that the response 506 may be a unicast response intended to be received only by the PV supervisor 106. To avoid transmission collisions and/or interference from previous and upcoming transmissions, it may be advantageous for each device (e.g., inverter 104) to wait until an expected transmission time (i.e., a certain amount of time Tp after the start of the slot 504) before beginning its response 506 and to cease transmitting at a transmission stop time (i.e., a certain amount of time Ts before the end of the slot 504).

As discussed herein, however, if a certain amount of time Tj has passed since Tp, the PV supervisor 104 may determine that a device (e.g., inverter 104) has missed its transmission slot 504 and transmit a jam signal to ensure that a second, third, fourth, etc. PV supervisor 106 of second, third, further, etc. electric system 100 does not mistakenly determine that the shared power line 116 is not in use. Further, one or more inverters 104 may have missed its assigned transmission slot 504 in a transmission window 500. FIG. 5 depicts a transmission window 500 in which a first inverter 104 assigned transmission slot $504_3$ failed to transmit and second inverter 104 assigned transmission slot $504_6$ also failed to transmit. As discussed herein in connection to FIG. 4 and FIG. 6, in missed transmission slots $504_3$ and $504_6$ the PV supervisor 106 may transmit jam signals 508 and 510, respectively, to prevent a second, third, fourth, etc. PV supervisor 106 of a second, third, fourth, etc. electric system 100 from determining that the shared power line 116 is available for transmission.

Figure 6:
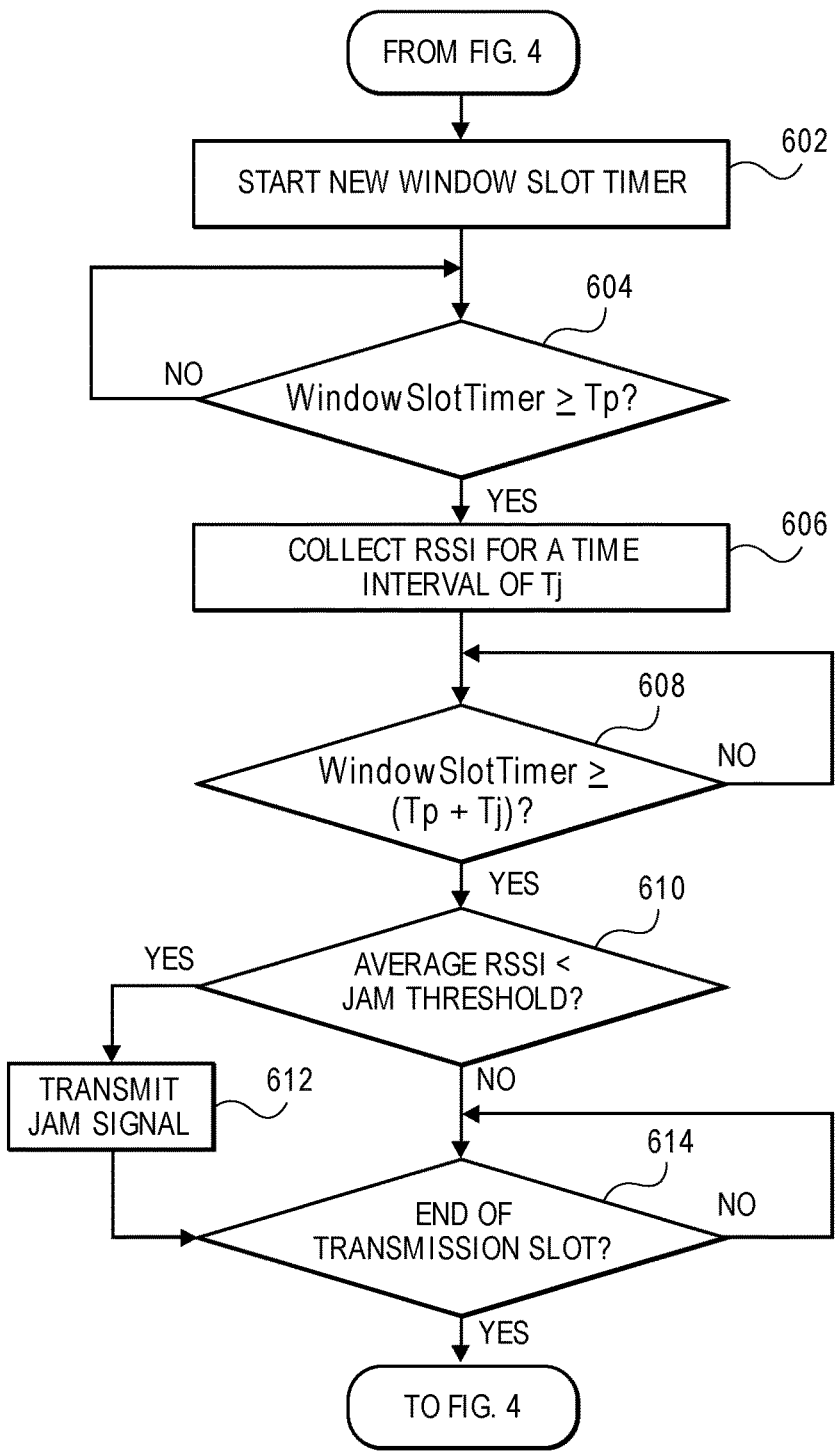
FIG. 6 depicts an example shared power line jamming method in accordance with the presently described embodiments.

Referring now to FIG. 6, a flow chart illustrating the process performed by the PV supervisor at block 412 is shown, according to some embodiments. In various embodiments, the method of FIG. 6 can include additional (or fewer) blocks than illustrated. As discussed herein, before the PV supervisor 106 performs the process associated with block 412, the PV supervisor 106 is expecting a response from a device over the shared power line 116. Accordingly, the process associated with block 412 is performed either just after the PV supervisor 106 has transmitted its message at the beginning of the transmission window 500, or at the beginning of a transmission slot 504. At block 602, the PV supervisor 106 starts a new window slot timer. At block 604, the PV supervisor 106 determines whether the window slot timer is greater than or equal to Tp.

At block 606, the PV supervisor 106 collects RSSI (e.g., with its line interface PCB 306) for a time interval of Tj (e.g., 8 ms). At block 610, the PV supervisor determines whether the average RSSI over the time interval Tj is less than a jam threshold (e.g., 35 dBmV). It may be advantageous to adjust either or both of the time interval (i.e., shorter or longer) and the jam threshold level (e.g., from 35 dBmV to 40 dBmV or to 25 dBmV) depending on conditions at the site. If the level of background interference is high, for example, it may be advantageous to extend the time interval and/or increase the jam threshold level. Such adjustments may be perform manually in the field by a technician, remotely over the network 202 by a technician or automated system (e.g., remote system 204, one or more computer servers providing cloud computing services 206), or by the PV supervisor 106 measuring the noise level and increasing the jam threshold itself. In other embodiments, it may be advantageous for the PV supervisor 104 or automated system to determine the time interval and jam threshold level dynamically (e.g., periodically, before the transmission of each multicast message, etc.).

The dynamic determination of the jam threshold level may be performed by the PV supervisor 104, remote system 204, or one or more computer servers providing cloud computing services 206 based on historical RSSI measurement data determined from the power line 116, and a log of past communications on the shared power line 116. The historical RSSI measurement data may include RSSI measurements determined from the power line 116 over a period of time (e.g., 1 hour, 2 hours, 3 hours, 1 day) cross-referenced with the log of past communications during the period of time. The log of past communications may include all transmission sent by the PV supervisor 106 and the transmissions sent by devices on the electric system 100 (e.g., inverter 104, electric meter 110, electric storage device 114). The log of past communications may also include transmissions made by the PV supervisor 106 and devices of a second, third, fourth, etc. electric system 100 if such transmission are received and can be decoded. Using the historical RSSI data and log of past communications, the average RSSI during intervals when transmission were being made by PV supervisors 106 or devices on the electric system 100 were made or received by the PV supervisor 106 may be determined ("average transmission RSSI"). The average transmission RSSI may represent an expected signal strength of communications on the shared power line 116. The jam threshold may be set above or below the average transmission RSSI by an offset (e.g., 10 dBmV, 20 dBmV), or alternatively the average transmission RSSI may be used as the jam threshold.

If the average RSSI over the time interval Tj is less than the jam threshold, at block 612 the PV supervisor transmits a jam signal (e.g., a jam signal 508 or 510) on the shared transmission line at a jam start time Tw where Tw=Tp+Tj. The jam signal may include, for example, one or more symbols (e.g., the letter 'A' encoded in ASCII binary) repeated or any other kind of message according to the PLC protocol. The content of the jam signal may not be important, instead the strength of the signal may be sufficient for to cause a device (e.g., a second PV supervisor 106) measuring the RSSI on the shared power line 116 to determine that the line is in use. A jamming PV supervisor 106 may transmit the jam signal until a transmission stop time Ts before the end of the transmission slot 604. At block 614, the PV supervisor 106 determines whether the transmission slot is ended. Referring again to FIG. 4, after the end of the transmission slot, the PV supervisor 106 either expects to receive another response transmission or finishes its use of the shared power line 116.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An electric system coupled to a shared power line, the electric system comprising:

a plurality of inverters, each inverter coupled to the shared power line and adapted to use the shared power line to communicate information; and a first supervisor coupled to the shared power line, the first supervisor including:
- a line interface coupled to the shared power line,
- a processor, and
- a program memory storing executable instructions that when executed by the processor cause the first supervisor to:
  - determine with the line interface whether the shared power line is busy,
  - if the shared power line is not busy, allocate unicast transmission time slots to each of the plurality of inverters,
  - transmit with the line interface a multicast message requesting that each of the plurality of inverters communicate information during its allocated unicast transmission time slot using the shared power line,
  - determine with the line interface whether a first inverter in the plurality of inverters did not communicate using the shared power line during its allocated unicast transmission time slot, and
  - if the first inverter did not communicate the information during its allocated unicast transmission time slot, transmit with the line interface a jam signal during the first inverter's unicast transmission time slot.

2. The electric system of claim 1 wherein the executable instructions that when executed by the processor cause the first supervisor to determine whether the shared power line is busy include instructions to determine whether a received signal strength indicator is above a threshold strength for a threshold amount of time.

3. The electric system of claim 2 wherein the threshold strength and the threshold amount of time are calculated based on an electrical characteristics of the shared power line.

4. The electric system of claim 1:
wherein each unicast transmission time slot includes an expected transmission time, Tp; and
wherein the executable instructions that when executed by the processor cause the first supervisor to determine with the line interface whether the first inverter in the plurality of inverters did not communicate using the shared power line during its allocated unicast transmission time slot include instructions to determine whether a received signal strength measured from the shared power line is above a threshold.

5. The electric system claim 4 wherein the executable instructions that when executed by the processor cause the first supervisor to transmit the jam signal during the first inverter's unicast transmission time slot include instructions to transmit the jam signal between a jam start time, Tw, and a transmission stop time, Ts, wherein Tw occurs after Tp and Ts occurs before the end of the first inverter's unicast transmission slot.

6. The electric system of claim 1 further comprising:
a second supervisor coupled to the shared power line, the second supervisor including:
- a second line interface coupled to the shared power line,
- a second processor, and
- a second program memory storing executable instructions that when executed by the second processor cause the second supervisor to:
  - receive with the second line interface the jam signal,
  - wait a predetermined amount of time, and
  - after the predetermined amount of time, determine with the second line interface whether the shared power line is busy.

7. The electric system of claim 1 wherein the plurality of inverters are adapted to use the shared power line to communicate information by modulating a signal on to a carrier wave.

8. The electric system of claim 1 wherein communicated information includes indicators of one or more of inverter temperature, inverter input voltage, inverter output voltage, inverter input current, inverter output current, and output frequency.

9. A method of coordinating multiple access of a shared power line by a plurality of inverters and one or more supervisors, the method comprising:
determining with a first supervisor whether the shared power line is busy;
if the shared power line is not busy, allocating with the first supervisor unicast transmission time slots to each of the plurality of inverters;
transmitting with the supervisor a multicast message requesting that each of the plurality of inverters communicate information during its allocated unicast transmission time slot using the shared power line;
determining with the first supervisor whether a first inverter in the plurality of inverters did not communicate using the shared power line during its allocated unicast transmission time slot; and
if the first inverter did not communicate the information during its allocated unicast transmission time slot, transmitting with the first supervisor a jam signal during the first inverter's unicast transmission time slot.

10. The method of claim 9 wherein determining with the first supervisor whether the shared power line is busy include instructions to determine whether a received signal strength indicator is above a threshold strength for a threshold amount of time.

11. The method of claim 10 wherein the threshold strength and the threshold amount of time are calculated based on an electrical characteristics of the shared power line.

12. The method of claim 9:
wherein each unicast transmission time slot includes an expected transmission time, Tp; and
wherein determining with the first supervisor whether the first inverter in the plurality of inverters did not communicate using the shared power line during its allocated unicast transmission time slot include instructions to determine whether a received signal strength measured from the shared power line is above a threshold.

13. The method of claim 9 wherein transmitting with the first supervisor the jam signal during the first inverter's unicast transmission time slot include instructions to transmit the jam signal between a jam start time, Tw, and a transmission stop time, Ts, wherein Tw occurs after Tp and Ts occurs before the end of the first inverter's unicast transmission slot.

14. The method of claim 9 further comprising:
receiving with a second supervisor the jam signal,
a predetermined amount of time after receiving the jam signal, determining with the second supervisor whether the shared power line is busy.

15. The method of claim 9 wherein communicated information includes indicators of one or more of inverter temperature, inverter input voltage, inverter output voltage, inverter input current, inverter output current, and output frequency.

16. A tangible, non-transitory computer-readable medium storing executable instructions that when executed by a processor of a supervisor coupled to a shared power line cause the supervisor to:
- determine whether the shared power line is busy;
- if the shared power line is not busy, allocate unicast transmission time slots to each of a plurality of inverters coupled to the shared power line;
- transmit a multicast message requesting that each of the plurality of inverters communicate information during its allocated unicast transmission time slot using the shared power line;
- determine whether a first inverter in the plurality of inverters did not communicate using the shared power line during its allocated unicast transmission time slot; and
- if the first inverter did not communicate the information during its allocated unicast transmission time slot, transmit a jam signal during the first inverter's unicast transmission time slot.

17. The tangible, non-transitory computer-readable medium of claim 16 wherein the executable instructions that when executed by the processor cause the supervisor to determine whether the shared power line is busy include instructions to determine whether a received signal strength indicator is above a threshold strength for a threshold amount of time.

18. The tangible, non-transitory computer-readable medium of claim 17 wherein the threshold strength and the threshold amount of time are calculated based on an electrical characteristics of the shared power line.

19. The tangible, non-transitory computer-readable medium of claim 16:
- wherein each unicast transmission time slot includes an expected transmission time, Tp; and
- wherein the executable instructions that when executed by the processor cause the supervisor to determine whether the first inverter did not communicate using the shared power line during the first unicast transmission time slot include instructions to determine whether the first inverter has begun transmitting by Tp.

20. The tangible, non-transitory computer-readable medium of claim 16 wherein the executable instructions that when executed by the processor cause the first supervisor to transmit the jam signal during the first inverter's unicast transmission time slot include instructions to transmit the jam signal between a jam start time, Tw, and a transmission stop time, Ts, wherein Tw occurs after Tp and Ts occurs before the end of the first inverter's unicast transmission slot.

* * * * *